United States Patent [19]

Gill

[11] Patent Number: 5,243,863
[45] Date of Patent: Sep. 14, 1993

[54] FLUID FLOW MEASUREMENT SYSTEM USING TWO TRANSDUCERS WITH PARTITIONS THEREBETWEEN

[75] Inventor: Michael J. Gill, Milford-on-Sea, United Kingdom

[73] Assignee: British Gas plc, London, United Kingdom

[21] Appl. No.: 760,385

[22] Filed: Sep. 16, 1991

[30] Foreign Application Priority Data

Oct. 2, 1990 [GB] United Kingdom ............... 9021441

[51] Int. Cl.$^5$ ............................................. G01F 1/66
[52] U.S. Cl. ............................................. 73/861.28
[58] Field of Search ............................. 73/861.28

[56] References Cited

U.S. PATENT DOCUMENTS

| | | | |
|---|---|---|---|
| 3,964,309 | 6/1976 | Husse et al. | 73/861.28 |
| 4,320,666 | 3/1982 | Redding | 73/861.28 |
| 4,325,262 | 4/1982 | Meisser et al. | 73/861.28 |
| 4,365,518 | 12/1982 | Zacharias, Jr. | 73/861.28 X |
| 4,425,804 | 1/1984 | Mount et al. | 73/861.28 |
| 4,480,486 | 11/1984 | Meisser et al. | 73/861.28 |
| 4,506,552 | 3/1985 | Brown et al. | 73/861.28 |

Primary Examiner—Michael T. Razavi
Assistant Examiner—Elizabeth L. Shopbell
Attorney, Agent, or Firm—Oblon, Spivak, McClelland, Maier & Neustadt

[57] ABSTRACT

A measurement system includes a housing 10 with a duct 11 having an inlet 13 and outlet 14. Fluid passes though a number of apertures 47 in a chamber 21 and then through a measuring tube 40 which incorporates extensions 41. Fluid exits via chamber 22 and its apertures 47 to outlet 14. Transducers 36,37 are provided in chambers 53,50 and have an acoustic path through the measuring tube. Control electronics cause the transducers to send a burst of signals in alternate directions through the tube to determine fluid speed.

25 Claims, 5 Drawing Sheets

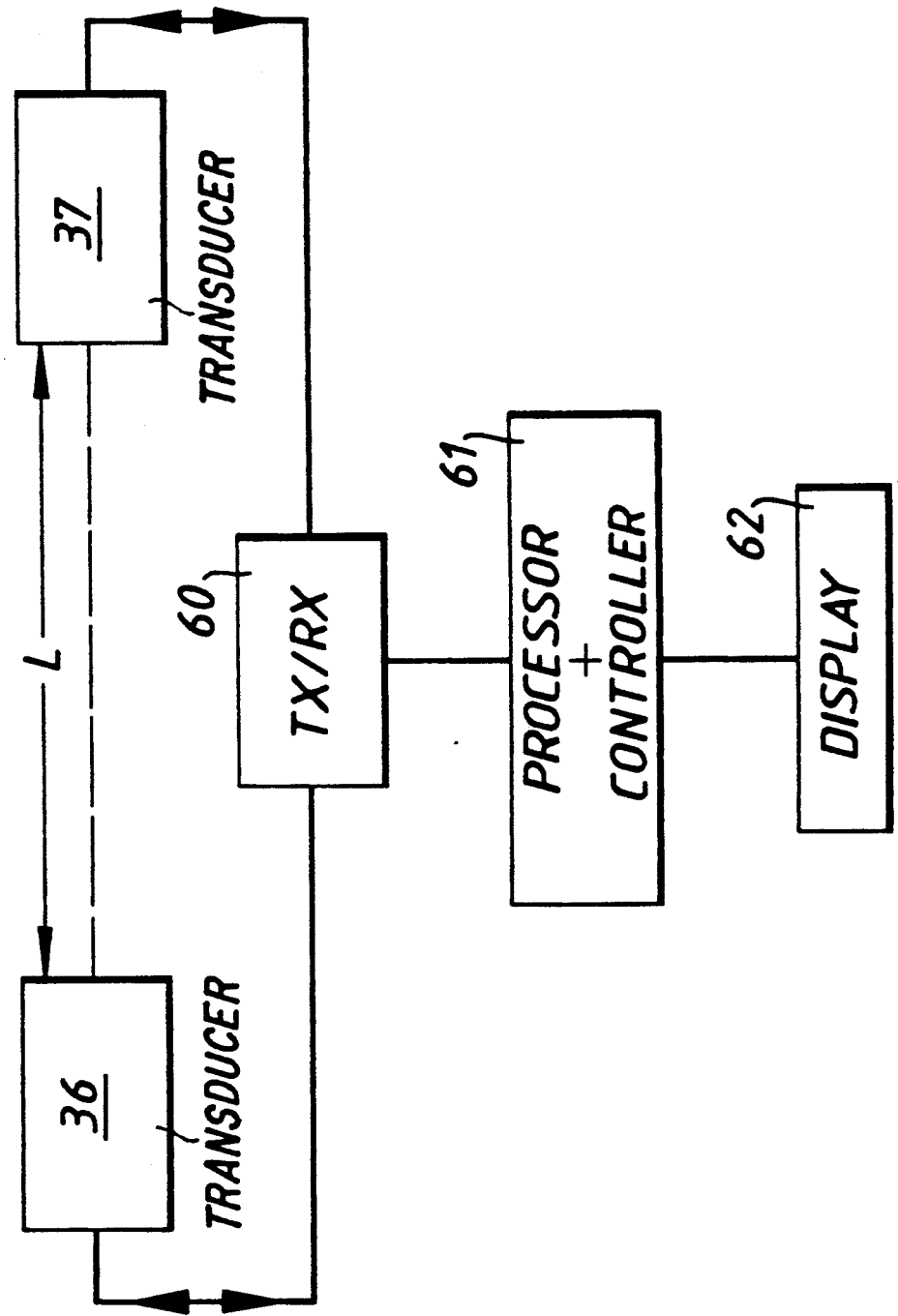

FLUID FLOW MEASUREMENT SYSTEM USING TWO TRANSDUCERS WITH PARTITIONS THEREBETWEEN

The invention relates to a measurement system and more particularly to a system for measuring the speed of fluid to allow flow rate to be determined using two transducers.

One such system is disclosed in our copending patent application (UK 8813640) relating to an arrangement for measuring, inter alia, gas flow in a gas meter. The arrangement determines the speed or volume of gas by detecting the time of flight of an ultrasonic signal in both directions between first and second transducers disposed opposite each other in a measuring duct and uses this result to compute the gas speed and from this the volume of gas consumed.

The present arrangement is concerned with improvements to such measurement configurations to enable accurate and repeatable results to be achieved.

According to the invention there is provided apparatus for measuring the flow of a fluid, comprising: first and second transducer means disposed in a duct and spaced one from another to define an acoustic path, a measuring tube within the duct and located between the transducer means for increasing the speed of the fluid along at least part of the acoustic path, and means for providing a substantially parallel beam of acoustic signals through the path in the measuring tube from the transducer means, the means for providing the parallel beam including partitioning means having an aperture therein, the partitioning means being configured to prevent nonparallel transmissions from the transducer means passing along the measuring tube.

Further according to the invention there is provided apparatus for measuring the flow of a fluid, comprising: first and second transducer means disposed in a duct and spaced one from another to define an acoustic path, a measuring tube within the duct for increasing the speed of the fluid along at least part of the fluid path, inlet means for receiving the fluid, and labyrinth means between the inlet means and the measuring tube to provide a fluid path of reduced turbulence.

Further according to the invention there is provided apparatus for measuring the flow of a fluid comprising: first and second transducer means disposed in a duct and spaced one from another to define an acoustic path, a measuring tube within the duct for increasing the speed of the fluid along at least part of the fluid path, a first chamber coaxial with the measuring tube, a second chamber coaxial with the measuring tube, a third chamber abutting the first chamber and a fourth chamber abutting the second chamber, the first transducer being disposed in the third chamber and the second transducer being disposed in the fourth chamber.

The invention will now be described by way of example with reference to the accompanying drawings in which:

FIG. 5 shows details of electronic circuitry associated with the measurement of flow.

Figure 1:
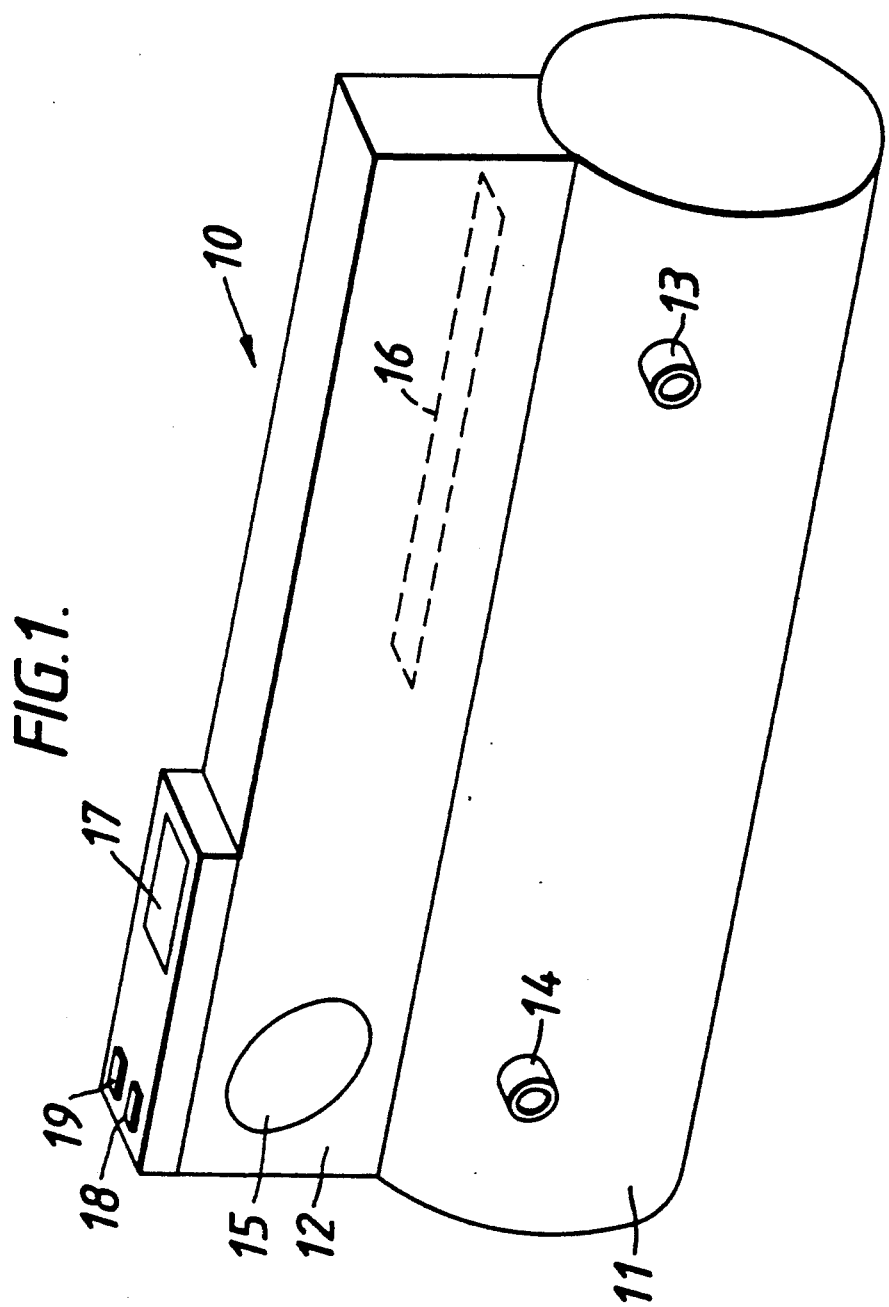
FIG. 1 shows a housing which incorporates a duct with a measurement chamber and electronics and battery supply.

The arrangement of FIG. 1 comprises a housing 10 (e.g. of plastics material) incorporating a duct 11 with fluid flow inlet 13 and outlet 14. Above the duct 11 is a second part 12 of the housing 10 which incorporates a battery compartment accessible by means of a screw plate 15 and includes a circuit board 16 carrying the electronic components for operating the system. A display 17 (eg. a LCD) provides visual indication of the metering and the switches 18,19 provide display selection.

Within the duct 11 are a pair of transducers 36, 37 (see FIG. 2) which are used to measure the rate of flow within the duct in a manner described in more detail below, to act as a metering device, for example.

Figure 3:
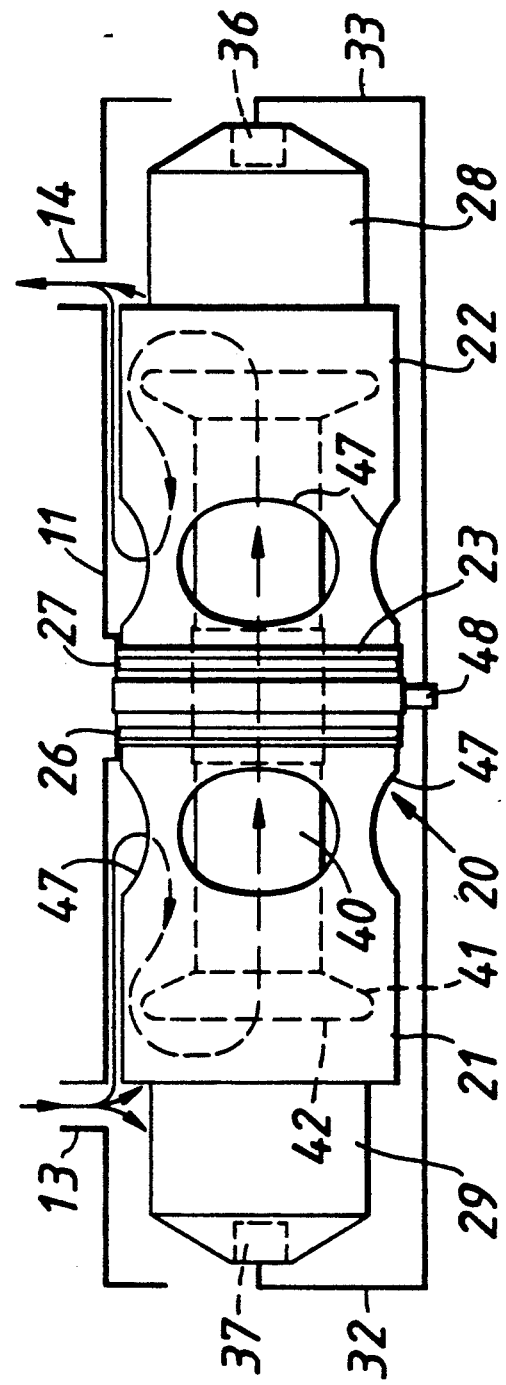
FIG. 3 shows the flow chamber and transducer aspects in more detail.
Figure 4:
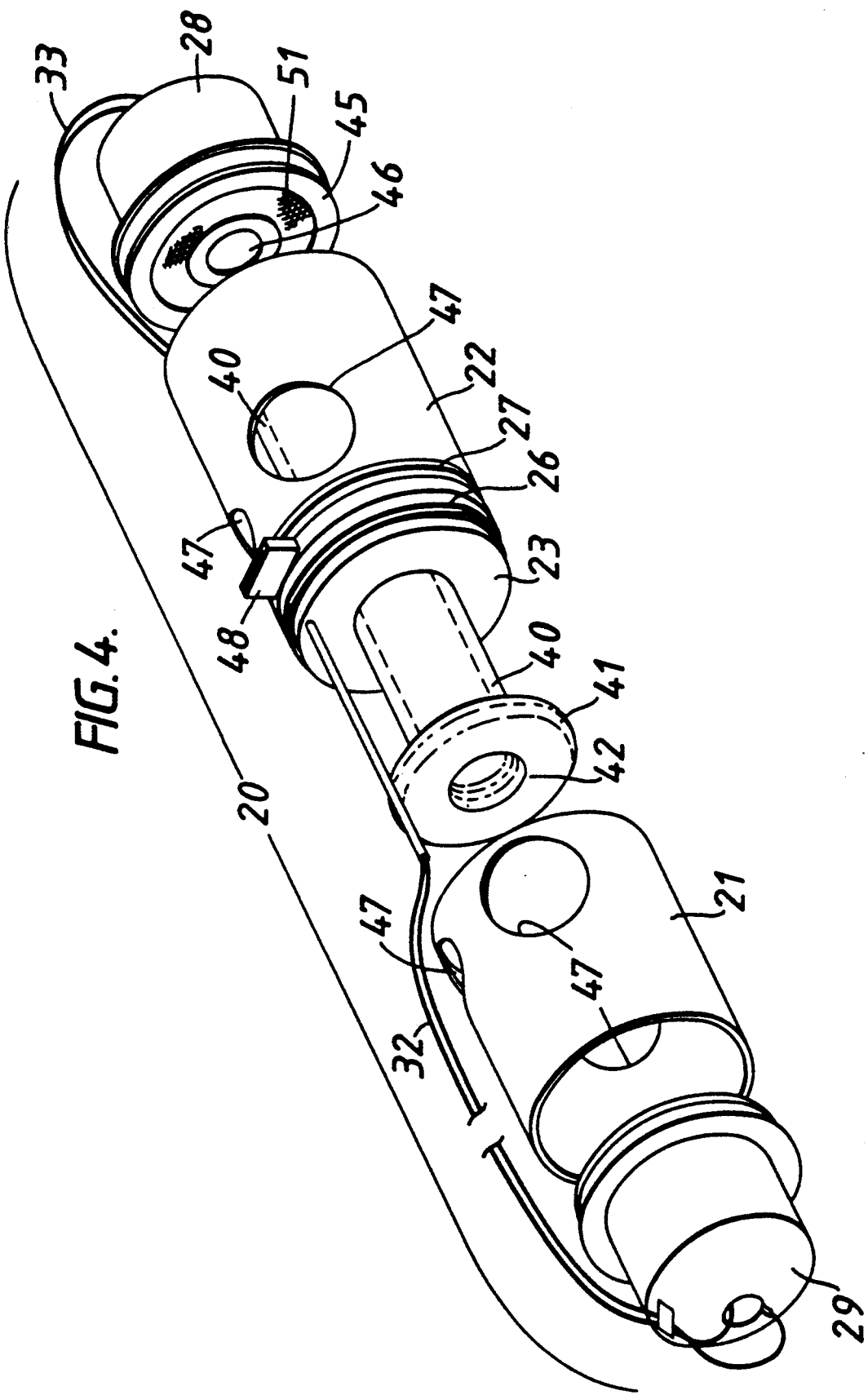
FIG. 4 shows an exploded view of the FIG. 3 arrangement.

The transducers which operate at ultrasonic frequencies, are incorporated within a flow chamber assembly 20 within the duct (see also FIGS. 3 and 4).

This assembly includes two cylindrical chambers 21,22 which are affixed to a central circular support 23. The support also carries an inner, generally tubular member 40 coaxial with the chambers 21,22.

Mounted on the outer periphery of support 23 are two O-rings 26,27 (eg. of rubber) which effect a seal when mounted within housing 11. This results in the chambers 21 and 22 being isolated from each other and the only passage therebetween being provided via the tube 40.

The tube 40 includes disc-like extensions 41 at each end and the diameter of the bore of the tube increases adjacent each end in the region 42 to provide modifications to the fluid flow path as described in more detail below.

The chambers 21,22 each include a number of circular apertures 47 around their periphery to form passageways for the fluid entry or exit.

As can be seen from FIG. 3, the fluid passes into the measuring system at inlet 13 and moves within the housing duct 11 so as to pass around the outside of chamber 21 and thence through the apertures 47 into the chamber 21. The fluid then continues through the chamber 21 passing over the disc-like extensions 41 and through the shaped region 42 of tube 40. After travelling down the tube 40, the fluid emerges and passes over the extension 41 and passes out through the apertures 47 in chamber 22. External of this chamber, the fluid passes through the housing and through the exit 14.

Thus it can be seen that the various passages form a labyrinth for the fluid to reduce turbulent flow in the vicinity of the tube 40. The shape of the tube end regions 42 and extensions 41 assist in this. In the case of handling a gas, such as methane for domestic use, there may be dust particles carried in the flow and the labyrinth assists in preventing the dust passing into the measuring tube 40. Instead, the dust tends to settle in the bottom of the housing external of the chamber 21.

One of the reasons why the bore size of the tube 40 is chosen to be narrow is to ensure that there is a sufficient speed increase to remove any stray dust particles which manage to elude the labyrinth. Typically, the tube bore size relative to to diameters of chamber 21 and 22 is selected to cause a speed increase which is fourfold. Too narrow a tube will cause unwanted pressure drops. The speed increase also helps in measuring the flow rate as described below. The exiting gas from the tube 40 will suffer a smooth transition from the fast to slow speed due to the curved tapering shape and disc extension incorporated in the tube 40.

Hence by controlling the change from high speed flow at the exit of tube 40 to the lower speed in this manner by radial expansion ) allows kinetic energy which is commonly lost as turbulence and which would result in a high pressure drop, to be to a large extent recovered. This results in a higher flow rate for a given pressure drop to be achieved. Higher flow provides greater sensitivity for the ultrasonic transducers and provides a purging action for any dust particles in the tube, preventing settlement in this sensitive area of the measurement system, as mentioned above.

In reverse manner at the input to the tube 40, the gas is subject to increase in flow in a controlled manner by radial contraction as it moves over disc extension 41 into the narrowing bore of the tube 40.

Figure 2:
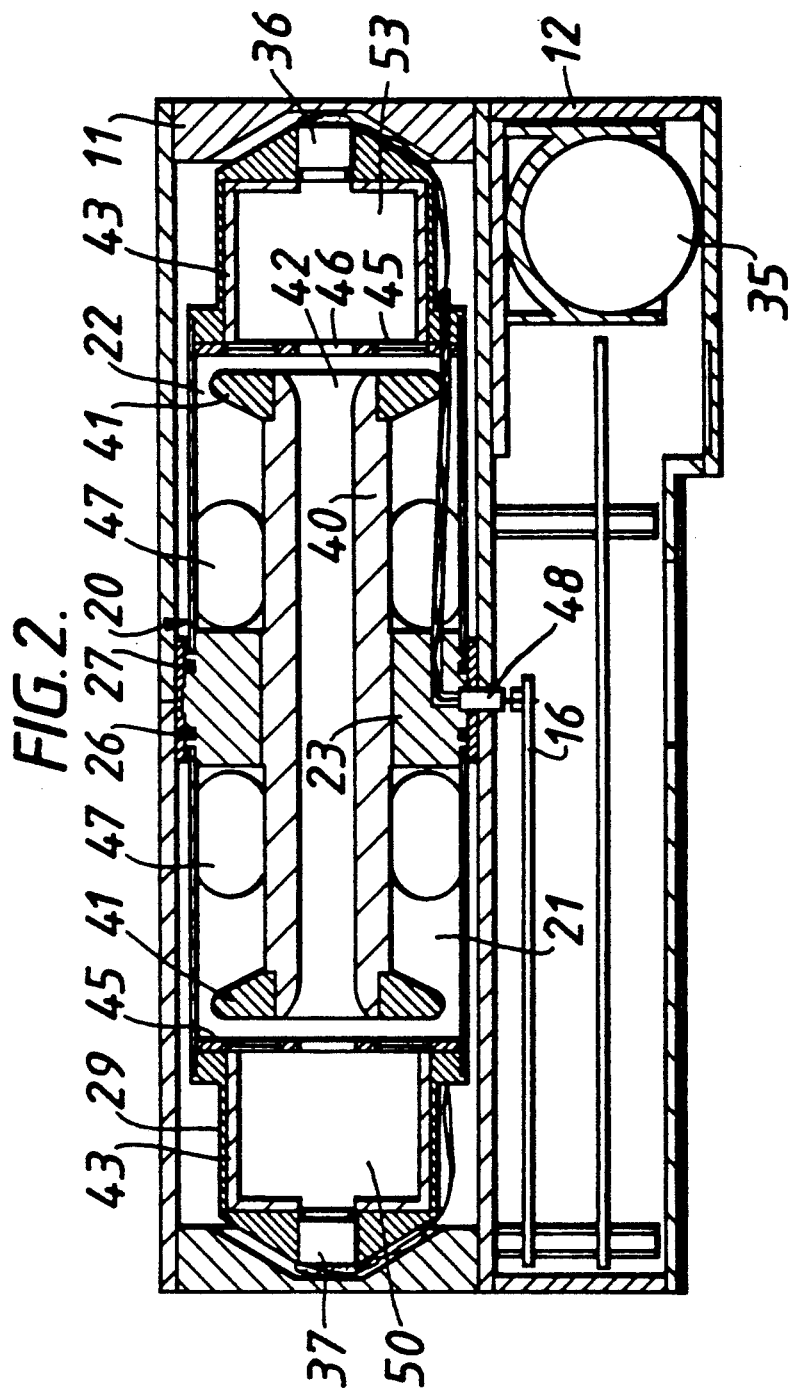
FIG. 2 shows a sectional view of the FIG. 1 housing.

Extending from the chamber 21 is a transducer housing 29 containing one of the ultrasonic transducers 37. The transducer as seen from FIG. 2 is separated from chamber 21 by partition 45. Thus transducer 37 is located at one end of a chamber 50 and the partition 45 is at the other end of the chamber 50. The chamber is lined with acoustic material 43 to avoid unwanted reflections at ultrasonic frequencies.

The partition includes a circular aperture 46 in line with the transducer to allow ultrasonic signals to pass through to the tube 40. The aperture will be covered with gauze 51 or similar material (see FIG. 4). The provision of chamber 50 with only a small aperture allows only generally parallel waves to pass therethrough so that some waves from the diverging beam are stopped by the partition 45. The location of the transducer 37 at the far end of the chamber 50 assists with this action and also reduces the risk of dust contamination of the transducer. The chamber partition also isolates the transducer chamber from the fluid path.

Parallel waves are preferable, because diverging waves would tend to take a path which may be deflected by the inner wall of the tube and cause spurious speed measurements to be obtained. Hence the extremes of multimode propagation are avoided and better results are obtained.

A similar arrangement is provided for transducer 36. This has a housing 28 and the transducer is located within chamber 53 at the end remote from the partition 45. This is required because the transducers are switched to alternate as transmitter and receiver, so that each transducer at certain periods will be required to provide a substantially parallel beam via the aperture 46. Acoustic lining 43 is again provided.

The transducers are connected to the electronic circuit board via wires 32,33 and an electrical connector 48. The power source for the circuits operating with the transducers is provided by battery 35.

The operation of the system is shown in FIG. 5. In this simplified diagram, the transducers 36,37 are spaced by a distance L. A transmitter/receiver block 60 employs transducer 36 to transmit a burst of signals and after these have passed through the tube 40 of FIG. 3 they are received by transducer 37 which passes the signal via the block 60 to the processor/control 61. The time taken for the ultrasonic signal will depend on the distance L and the speed of the gas. A phase reversal marker can be provided on the signal to more accurately detect the time of flight of the ultrasonic signal burst.

The transducer operation is then reversed and the transducer 37 now becomes the transmitter and transducer 36 becomes the receiver. The time of travel of the burst is again computed. The difference in time measured is dependent on the gas flow rate.

The restricted bore size of tube 40 increases relative flow rate so as to accentuate the travel time difference. By determining this value, the volume of flow can be calculated and usage of gas accumulated. Results can be passed to display 62.

In practice, not only the distance between the transducers needs to be determined but also the length of the gas flow path between these transducers needs to be accurately known. This effective length of the moving gas column must remain substantially constant in use for accurate results to be maintained.

In our particular arrangement, this gas flow path will be shorter than the distance L between the transducers. In practice, in our device, the effective length of the moving gas column will be very close to the length of the measuring tube 40, due to the unique tube configuration with its associated entry and exit arrangements.

Thus the radial configuration of gas entry to and exit from the flow tube ensures a good definition of the moving column length, with minimal transition regions. Gas behaviour in the transition regions is affected by characteristics such as density and viscosity, so minimisation of transition regions is very helpful in making meter performance independent of gas composition.

I claim:

1. Apparatus for measuring the flow of a fluid, comprising: first and second transducer means disposed in a duct and spaced one from another to define an acoustic path; a measuring tube within the duct and located between the first and second transducer means for increasing the speed of the fluid along at least part of the acoustic path; and means or providing a substantially parallel beam of acoustic signals through the path in the measuring tube and between the transducer means, the means for providing the parallel beam includes partitioning means having an aperture therein, the partitioning means being position between each of the first and second transducer means and the measuring tube and being configured to prevent noon-parallel transmissions from the transducer means passing along the measuring tube.

2. Apparatus for measuring the flow of a fluid, comprising: first and second transducer means disposed in a duct and spaced one from another to define an acoustic path; a measuring tube within the duct and located between the transducer means for increasing the speed of the fluid along at least part of the acoustic path; and means for providing a substantially parallel beam of acoustic signals through the path in the measuring tube from the transducer means, the means for providing the parallel beam includes partitioning means having an aperture therein, the partitioning means being configured to prevent non-parallel transmissions from the transducer means passing along the measuring tube; wherein the chamber of said acoustic means is provided with an acoustic lining, nd wherein the aperture of the partition means is provided with gauze or mesh for preventing ingress of unwanted particles.

3. Apparatus as claimed in claim 2, wherein eh means for providing a path includes a chamber, the partition means being provided at one end thereof and one of the transducer means used for transmission being located in the chamber but spaced from the partition means to cause divergent transmissions deviating from the acoustic path to be stopped by the partition means whilst allowing parallel transmissions to pass through the aperture therein.

4. Apparatus as claimed in claim 1 or 2, including a first chamber within the duct coaxial with and partially surrounding the measuring tube and having a plurality of openings to allow incoming fluid passage to the tube, and a second chamber within the duct coaxial with and partially surrounding the measuring tube and having a plurality of openings to allow outgoing fluid passage from the tube, the chambers being configured to allow fluid passage between each other only via the measuring tube.

5. Apparatus as claimed in claim 4, wherein the first and second chambers are separated by support means, said support means including a seal for cooperating with the duct to prevent fluid flow other than via the measuring tube.

6. Apparatus as claimed in claim 1 or 2 wherein each of said transducer means is configured to be used for both transmission and reception, and switching means are provided to select transmission or reception of acoustic signals.

7. Apparatus as claimed in claim 1 or 2 wherein computation means are provided to determine the speed and/or the volume of fluid passing through the measuring tube and display means are provided to provide a visual display of the results.

8. Apparatus for measuring the flow of a fluid, comprising:
   first and second transducer means disposed in a duct and spaced one from another to define an acoustic path, a measuring tube within the duct fir increasing the speed of the fluid along at least part of the fluid path, inlet means for receiving the fluid, nd labyrinth means between the inlet means and the measuring tube to provide a fluid path of reduced turbulence,
   wherein the measuring tube includes extension means located adjacent each end thereof to modify the fluid flow so as to further reduce the generation of turbulence.

9. Apparatus as claimed in claim 8, wherein the labyrinth means includes a first chamber within the duct coaxial with and partially surrounding the measuring tube and having a plurality of openings to allow incoming fluid passage to the tube, and a second chamber within the duct coaxial with and partially surrounding the measuring tube and having a plurality of openings to allow outgoing fluid passage from the tube, the chambers being configured to allow fluid passage between each other only via the measuring tube.

10. Apparatus as claimed in claim 9, wherein the openings in the first chamber are positioned downstream relative to the entrance of the measuring tube whereby fluid passing through the openings will be required to flow back towards the measuring tube entrance so as to increase the labyrinth length.

11. Apparatus as claimed in claim 10, wherein the openings in the second chamber are positioned upstream relative to the exit of the measuring tube whereby fluid passing through the openings will be required to flow back from the measuring tube exit so as to increase the labyrinth length.

12. Apparatus as claimed in claim 9, 10 or 11, wherein the first and second chambers are separated by support means, said support means including a seal for cooperating with the duct to prevent fluid flow other than via the measuring tube.

13. Apparatus as claimed in claim 8, 9, 10 or 11, wherein each of said transducer means is configured to be used for both transmission and reception, and switching means are provided to select transmission or reception of acoustic signals.

14. Apparatus as claimed in claim 8, 9, 10 or 11, wherein computation means are provided to determine the speed and/or the volume of fluid passing through the measuring tube and display means are provided to provide visual display of the results.

15. Apparatus as claimed in claim 8, wherein the duct, the measuring tube and the labyrinth means comprise three coaxial tubes.

16. Apparatus as claimed in claim 15, wherein the three coaxial tubes are arranged such that the fluid will pass through a portion of the duct, through a portion of the labyrinth means, through the measuring tube, through a further portion of the labyrinth means and then through a further portion of the duct.

17. Apparatus for measuring the flow of a fluid, comprising:
   first and second transducer means disposed in a duct and spaced one from another to define an acoustic path, a measuring tube within the duct for increasing the speed of the fluid along at least part of the fluid path, a first chamber coaxial with the measuring tube, a second chamber coaxial with the measuring tube, a third chamber abutting the first chamber and a fourth chamber abutting the second chamber, the first transducer being disposed in the third chamber and the second transducer being disposed in the fourth chamber,
   wherein the third and fourth chambers include restriction means at an end remote for the transducer means to present the passage of fluid thereto.

18. Apparatus for measuring the flow of a fluid comprising:
   first and second transducer means disposed in a duct and spaced one from another to define an acoustic path, a measuring tube within the duct for increasing the speed of the fluid along at least part of the fluid path, a first chamber coaxial with the measuring tube, a second chamber coaxial with the measuring tube, a third chamber abutting the first chamber and a fourth chamber abutting the second chamber, the first transducer being disposed in the third chamber and the second transducer being disposed in the fourth chamber,
   wherein the measuring tube include extension means located adjacent each end thereof to modify the fluid flow so as to further reduce the generation turbulence.

19. Apparatus as claimed in claim 17, wherein the third and fourth chambers incorporate an acoustic lining.

20. Apparatus as claimed in claim 17, wherein the first and second chambers are separated by support means, said support means including a seal for cooperating with the duct to prevent fluid flow other than via the measuring tube.

21. Apparatus as claimed in claim 17 or 18, wherein each of said first and second chambers include a plurality of openings to allow passage of fluid along the tube via said openings.

22. Apparatus as claimed in claim 17 or 18, wherein each of said transducer means is configured to be used for both transmission and reception, and switching means are provided to select transmission or reception of acoustic signals.

23. Apparatus as claimed in claim 10 or 18, wherein computation means are provided to determine the speed and/or the volume of fluid passing through the measuring tube and display means are provided to provide visual display of the results.

24. Apparatus for measuring the flow of a fluid, comprising: first and second transducer means disposed in a duct and spaced one from another to define an acoustic path; a measuring tube within the duct and located between the transducer means or increasing the speed of the fluid along at least part of the acoustic path; and means for providing a substantially parallel beam of acoustic signals through the path in the measuring tube from the transducer means, the means for providing the parallel beam includes partitioning means having an aperture therein, the partitioning means being configured t prevent non-parallel transmissions from the transducer means passing along the measuring tube; wherein the measuring tube includes extension means located adjacent each end thereof to modify the fluid flow so as to reduce the generation of turbulence.

25. Apparatus for measuring the flow of a fluid, comprising:
first and second transducer means disposed in a duct and spaced one from another to define an acoustic path, a measuring tube within the duct for increasing the speed of the fluid along at least part of the fluid path, a first chamber coaxial with the measuring tube, a second chamber coaxial with the measuring tube, a third chamber abutting the first chamber and a fourth chamber abutting the second chamber, the first transducer being disposed in the third chamber and the second transducer being disposed in the fourth chamber,
wherein battery containing means are provided to receive a replaceable battery or a power source.

* * * * *